United States Patent Office 3,417,051
Patented Dec. 17, 1968

3,417,051
POLYETHERS AND PROCESS FOR THEIR
MANUFACTURE
Gunter Messwarb, Kelkheim, Taunus, Walter Luders, Neu-Isenburg, and Fritz Erdmann and Hartmut Steppan, Wiesbaden, Germany, assignors to Farbwerke Hoechst Aktiengesellschaft vormals Meister Lucius & Bruning
No Drawing. Filed Jan. 3, 1967, Ser. No. 606,539
Claims priority, application Germany, Jan. 7, 1966,
F 48,110
7 Claims. (Cl. 260—47)

ABSTRACT OF THE DISCLOSURE

Light-sensitive polyethers produced by copolymerization of an oxirane group containing compounds in the presence of ionic catalysts and suitable for the manufacture of films, sheetings, coatings and shaped articles which can be cross-linked under the action of light.

---

It is an object of this invention to provide novel copolymers which, according to their chemical structure, belong to the class of polyethers and are capable of undergoing reactions, for example cross-linking reactions and grafting reactions, under the action of light rays. It is another object of this invention to provide a process for the manufacture of the said polyethers.

It is known that high molecular weight polyethers can be prepared from compounds containing epoxide groups by polymerization in the presence of special catalysts.

Polymers of this type, for example polyethylene oxide, polypropylene oxide, polyepichlorhydrine, or copolymers of ethylene oxide, propylene oxide, epichlorhydrine, glycidyl compounds and other monomers containing epoxide groups, have valuable industrial uses.

Thus high molecular weight polyethylene oxide can be used for the preparation of sheets, films or as binders for the preparation of coating compounds.

Polypropylene oxide and polyepichlorhydrine have already been recommended as rubber-like materials.

It is also known that the mechanical properties of thermoplastic and elastomeric polymers can be improved to a certain extent by subsequent cross-linking (vulcanization).

It has already been described to subject unsaturated polyethers, such as copolymers of propylene oxide and allyl glycidyl ether, to the known sulfur vulcanization. Other methods of cross-linking products of the polyether type, methods which are known to the expert, consist, for example, in cross-linking polyethers under the action of peroxides or in treating chlorine-containing polymers with polyamines.

Cross-linking reactions of the said type always involve considerable chemical and thermal stress for the polymers to be cross-linked. Under these circumstances, discolorations of the product, disagreeable odors and partial chain cleavages—especially in the presence of aggressive cross-linking auxiliary agents—may occur.

The present invention provides a process for the manufacture of polyethers, which comprises copolymerizing compounds of Formula I

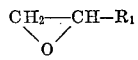

in which $R_1$ stands for hydrogen, alkyl, aryl, $-CH_2OR_2$, halogen-alkyl, wherein $R_2$ stands for alkyl, allyl, aryl, vinyl, with compounds of Formula II

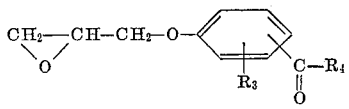

in which $R_3$ stands for hydrogen, alkyl, alkoxy, halogen, and in which $R_4$ stands for alkyl, phenyl, alkylaryl, alkoxyaryl, hydrogeno-aryl, in the presence of ionic catalysts which bring about an opening of the oxirane rings under the polymerization conditions.

In the compounds of Formula I, which are used for the polymerization according to the process of the present invention, $R_1$ stands for hydrogen; alkyl, preferably methyl, ethyl; aryl, preferably phenyl, methylphenyl, halogeno-phenyl, in which halogen may be F, Cl, Br or I; halogen-alkyl, preferably $-(CH_2)_nCl$, $-(CH_2)_nF$, in which $n$ is the whole number 1 or 2, $-CHCl_2$, $-CHF_2$, $-(CH_2)_mCCl_3$, $-(CH_2)_mCF_3$, in which $m$ is 0 or 1, $-CHCl-CH_2Cl$, $-CHF-CH_2F$; $-CH_2-OR_2$, $R_2$ being preferably an alkyl with 1 to 5 carbon atoms, allyl, vinyl, aryl, preferably phenyl, alkylphenyl, in which the alkyl group has 1 to 5 carbon atoms;

In the compounds of Formula II $R_3$ stands for hydrogen; alkyl, preferably methyl, ethyl; alkoxy, preferably methoxy, ethoxy; halogen, preferably Cl, Br; $R_4$ stands for alkyl, preferably with 1 to 5 carbon atoms; phenyl; alkylaryl, in which the alkyl group has 1 to 5 carbon atoms; alkoxyaryl, in which the alkoxy group has 1 to 5 carbon atoms; halogenoaryl, in which halogen may be F, Cl, Br, or I.

The polyethers prepared by the process of the present invention, for example in the form of sheets, films, coatings or shaped articles, are capable to react further, for example to cross-link, in the presence of free radical catalysts by exposure to light rays having a wave-length within the range of about 2000 to 7000 Angstrom units, if necessary in the presence of the conventional additives.

It is a special advantage of this process that the polyethers can be cross-linked under very mild working conditions within a short period of time in the absence of the conventional aggressive cross-linking agents whereby the mechanical properties of the flat structures of polyethers are improved and the surfaces are cured. This method of working enables the modification of surface structures of polyethers in a predetermined manner. A cross-linking reaction, for example, brings about a considerable improvement of the resistance of polyether films to solvents, or a grafting reaction carried out on the polyethers of the present invention in the presence of monomers polymerisable under the action of free radical catalysts brings about a chemical modification of the basic polymers which is often very desirable for industrial uses.

It is known to add low molecular weight sensitizers to polymers to bring about cross-linking by means of ultraviolet radiation. It has already been proposed to use ketones, such as acetone, acetophenone and benzophenone therefor. It has also already been attempted to render polymers of polar vinyl monomers reactive to light radiation by copolymerization carried out in the presence of free radicals with light-sensitive acrylic- or methacrylic esters (cf. British patent specification 981,049). The copolymerization of polar vinyl compounds carried out in known manner in the presence of free radicals with acrylic- or methacrylic acid esters of p-hydroxy-benzophenone derivatives was no teaching to carry out the ionic copolymerization, for example of ethylene oxide and/or propylene oxide with special glycidyl compounds for the process according to the present invention cannot be carried out by means of radical-forming compounds as catalysts.

It was not to be expected that the special light sensitizers now incorporated in a polyether chain according to the process of the present invention would bring about an unexpectedly high reactivity of the polyethers towards ultraviolet radiation, in many cases even towards daylight and the light of incandescent lamps.

Under comparable test conditions and under the same action of light rays the copolymers obtained by the process of the present invention are far superior to mere mixtures of light-insensitive polyethers and corresponding light-sensitive monomeric glycidyl compounds as regards the reactivity induced by exposure to radiation, for example the cross-linking effect.

In the polyether copolymers obtained according to the present invention the ketone Component II shall be incorporated in an amount of at least 0.01 mole percent, preferably in an amount exceeding 0.1 mole percent, calculated on the copolymer.

Copolymers which are especially interesting according to the present invention are those containing 0.1 to 10 mole percent, calculated on the copolymer, of ketone Component II. The incorporated portion may, on principle, be higher, however, a higher portion of ketone Component II is not generally used for reasons of economy since the advantage gained thereby would not justify the use of a higher amount of the ketone component.

The light-sensitive ketone Components II can be incorporated in the polyether chains in any desired sequence, either statistically or in blocks, or they can be bound to the terminal groups. It is of minor importance for the process according to the present invention whether the light-sensitized polyethers are present in an amorphous form, in a crystalline form or in a sterically arranged form.

In the copolymerization process according to the present invention, the following compounds may preferably be used as ketone Components II:

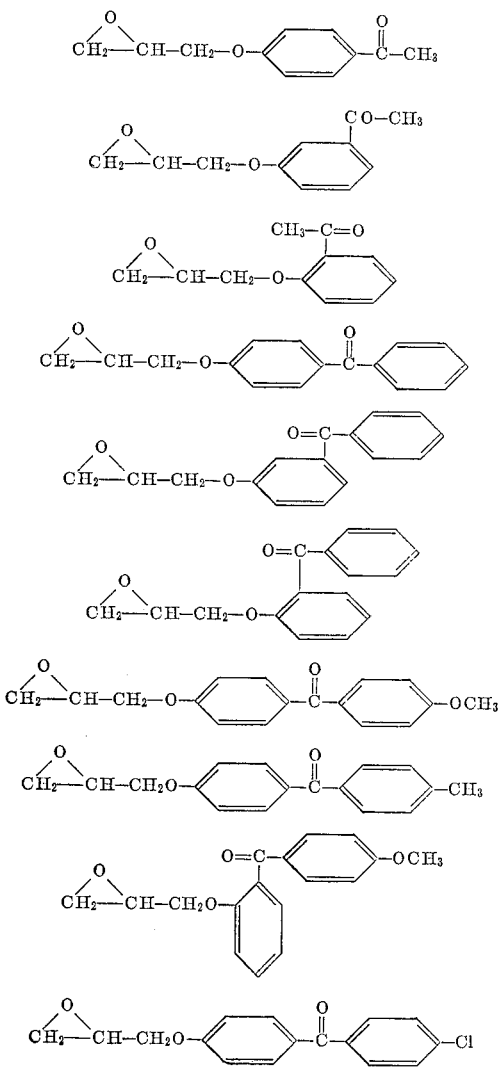

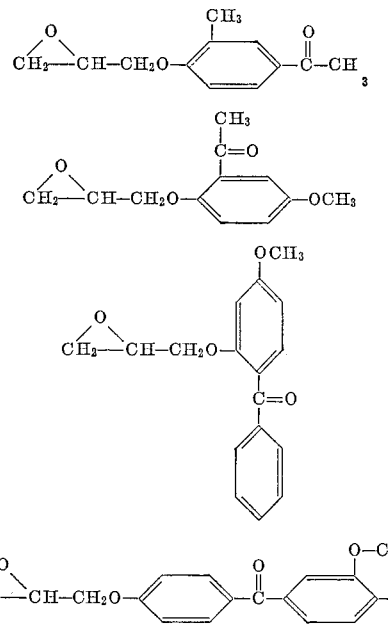

The effects attained by exposure to radiation are generally better with copolymers containing as Component II compounds of the benzophenone type than with the corresponding copolymers containing compounds of the acetophenone type.

As monomeric Component I for the preparation according to the present invention of the polyether copolymers there may be used alkylene oxides, for example ethylene oxide, propylene oxide, butylene oxide, furthermore substituted alkylene oxides, for example epichlorhydrine, epibromhydrine, 1,2-dichloro-3,4-epoxybutane, 1-chloro-3,4-epoxybutane, 1-chloro-4,5-epoxypentane, 1,1-dichloro-2,3-epoxypropane, 1,1,1 - trichloro-2,3-epoxypropane, 1,1,1-trichloro-3,4-epoxybutane, furthermore epoxy ethers, for example methyl glycidyl ethers, isobutyl glycidyl ethers, tertiary butyl glycidyl ethers, n-hexyl glycidyl ethers, n-octyl glycidyl ethers, phenyl glycidyl ethers, chlorophenyl glycidyl ethers, alkyl phenyl glycidyl ethers, chloroalkyl phenyl glycidyl ethers or unsaturated glycidyl ethers, for example vinyl glycidyl ethers, allyl glycidyl ethers and finally other epoxides, for example styrene oxide, butadiene monoepoxide. Ethylene oxide, propylene oxide, epichlorhydrine and styrene oxide are preferably used in the process according to the present invention.

For the polymerization according to the present invention ionic catalyst systems may be used which bring about the opening of oxirane rings under the polymerization conditions. As catalysts there may, for example, be used the hydroxides of an alkali metal or alkaline earth metal, furthermore calcium amide, zinc carbonate, iron (III) chloride, iron (III) alkoxide, iron (III) salts, $SbCl_5$, $SnCl_4$, $BF_3$, $BF_3$ etherate. The preferred catalysts are organic compounds of the metals aluminum, zinc and magnesium of the general formula $$MeR'R''_{x-1}$$

in which Me represents a metal of the valency $x$, R' represents alkyl, preferably methyl, ethyl; R'' represents H, alkyl, preferably methyl, ethyl; alkoxy, preferably methoxy, ethoxy; or hydroxyl.

The last-mentioned catalysts are prepared in known manner from the metal alkyls with the addition of defined small amounts of water and/or complex-forming compounds.

The copolymerization according to the present invention is carried out at temperatures within the range of from 20° to 100° C., preferably within the range of from 30° to 80° C. As solvents for the polymerization, there may be used, for example, aliphatic, aromatic and alicyclic hydrocarbons, preferably benzene hydrocarbons, boiling within the range of from 50 to 150° C., benzene, toluene, chlorinated hydrocarbons, preferably carbon tetrachloride and, if desired, ether.

It has proved to be advantageous to avoid exposure to daylight and normal room lighting during the polymerization reaction and the later work-up of the polymer products. Cross-linking proceeds much more slowly if the products are in solution than if they are in a solid form. It is, therefore, possible on principle to carry out the polymerization and the work-up also in the presence of diffuse light or ruby light.

The films, sheets, coatings and shaped articles are manufactured from the polyether copolymers generally obtained in solution by the conventional methods. Care should be taken in this process step that light is excluded to a large extent.

It is advantageous to carry out the copolymerization according to the present invention with the exclusion of oxygen, for example in an atmosphere of nitrogen. It is absolutely necessary that humidity be excluded as completely as possible.

The light-initiated conversions of the polyethers obtained by the process of the present invention, such as cross-linking- or grafting reactions, may take place either by exposure to sunlight or suitable artificial light sources.

In order to attain the optimum effect in cross-linking reactions it is advantageous to eliminate residual solvents and other disturbing impurities by a suitable conditioning of the polyether layers to be exposed to radiation. It has proved advantageous to condense the material prior to its exposure to radiation, for example by compression or calendering.

To carry out the grafting reactions of monomers which are polymerizable under the action of free radicals on the polyethers prepared by the process of the present invention, the methods described in literature may be applied. Those vinyl compounds are preferably applied which, as is known, are especially suitable for carrying out grafting reactions such as, for example acrylonitrile, acrylic acid, 2-vinyl-pyridine, vinyl chloride, styrene, vinyl acetate, vinyl formate, acrylic- and methacrylic acid esters, especially styrene, acrylonitrile and vinyl chloride.

The polymers prepared by the process of the present invention may be used as coating compounds for coating textiles, sheets and shaped articles.

The following examples serve to illustrate the invention, but they are not intended to limit it thereto, the parts and percentages being by weight:

Example 1

In a polymerization vessel protected against the action of light, 6.15 parts of a catalyst solution comprising 4.12 parts aluminum triethyl, dissolved in 11.23 parts n-heptane and 6.94 parts diethyl ether, 0.31 part water and 1.76 parts acetyl acetone, was added, in an atmosphere of nitrogen, to 100 parts toluene. The solution was heated at 60° C., and a monomer mixture comprising 8 parts ethylene oxide, 2 parts propylene oxide and 5 parts 4-benzoyl-phenyl-glycidyl ether was added dropwise during the course of 1 hour, with agitation. After stirring had been continued at 60° C. for 7 hours the polymerization was discontinued by the addition of 2 parts ethanol. The solution was concentrated by evaporation in vacuo at 50° C. Yield: 52%.

As a control experiment, a copolymer comprising 8 parts ethylene oxide and 2 parts propylene oxide was prepared in an analogous manner.

Films having a thickness of 0.1 mm. were cast from a benzenic solution of the two aforesaid polymers, said films being exposed to the radiation of an ultraviolet lamp (mercury maximum pressure burner Q 81, power input 70 watt, master Hanau(R)) at a distance of 10 cm. for 5 minutes. The film of the copolymer which contained 4-benzoyl-phenyl-glycidyl ether, was insoluble in benzene after this treatment, whereas the comparable film was soluble.

Example 2

In a polymerization vessel protected against the action of light, 100 parts toluene, 9.5 parts ethylene oxide, 0.5 part 4-benzoyl-phenyl-glycidyl ether and 6.15 parts of a catalyst solution comprising 4.12 parts aluminum triethyl, dissolved in 11.23 parts n-heptane and 6.94 parts diethyl ether, 0.31 part water and 1.76 parts acetyl acetone were agitated, in an atmosphere of nitrogen, at 60° C. for 5½ hours. Then the polymerization was interrupted by the addition of 2 parts anhydrous ethanol.

After the solvent had been concentrated by evaporation in vacuo at 50° C., a rubber-elastic solid matter remained in a yield of 46%.

As a control experiment, polyethylene oxide was prepared in an analogous manner.

Films having a thickness of 0.1 mm. were cast from a benzenic solution of the two polymers, said films being exposed to the radiation of an ultraviolet lamp (mercury maximum pressure burner Q 81, power input 70 watt, master Hanau(R)) at a distance of 10 cm. for 5 minutes.

The film of the copolymer which contained 4-benzoyl-phenylglycidyl ether was insoluble in benzene after this treatment, whereas the film of polyethylene oxide was soluble.

Example 3

In a polymerization vessel protected against the action of light, 100 parts toluene containing 0.7 part phosgene as a polymerization regulator, 6 parts propylene oxide, 3.5 parts phenyl glycidyl ether, 0.5 part 4-benzoyl-phenyl-glycidyl ether and 6.15 parts of a catalyst solution which comprised 4.12 parts aluminum triethyl, dissolved in 11.23 parts n-heptane and 6.94 parts diethyl ether, 0.31 part water and 1.76 parts acetyl acetone, were stirred in an atmosphere of nitrogen at 60° C. for 7 hours. Then the polymerization was interrupted by the addition of 2 parts anhydrous ethanol.

After the solution had been concentrated by evaporation in vacuo at 50° C., a rubber-elastic solid matter remained in a yield of 97%.

As a control experiment, a copolymer comprising 6 parts propylene oxide and 3.5 parts phenyl glycidyl ether was prepared in an analogous manner. Films having a thickness of 0.1 mm. were cast from a benzenic solution of the two polymers, which films were exposed to the action of a combined mercury vapor and incandescent lamp (Philips MLL 160 w.) at a distance of 18 cm. for 5 minutes.

In contradistinction to the comparable film, the film of the polymer containing 4-benzoyl-phenyl-glycidyl ether was insoluble in benzene after this treatment.

Example 4

100 parts toluene and 6.15 parts of a catalyst solution comprising 4.12 parts aluminum triethyl, dissolved in 11.23 parts n-heptane and 6.94 parts diethyl ether, 0.31 part water and 1.76 parts acetyl acetone, were placed, in an atmosphere of nitrogen, in a polymerization vessel protected against the action of light. The solution was heated at 60° C., and a mixture comprising 9 parts ethylene oxide and 1 part 2-acetyl-phenyl glycidyl ether was added dropwise during the course of 1 hour, with agitation. After stirring had been continued at 60° C. for 7 hours, the polymerization was discontinued by the addition of 2 parts ethanol. The solution was concentrated by evaporation in vacuo at 50° C. Yield: 70%.

A film having a thickness of 0.1 mm. was cast from a benzenic solution of this copolymer, which film was exposed to ultraviolet rays (mercury maximum pressure burner Q 81, power input 70 watt, master Hanau(R)) at a distance of 10 cm. for 5 minutes.

In contradistinction to a film of polyethylene oxide obtained according to the same process and treated in the same manner, the film was insoluble in benzene after this treatment.

Example 5

100 parts toluene and 6.15 parts of a catalyst solution comprising 4.12 parts aluminum triethyl, dissolved in 11.23 parts n-heptane and 6.94 parts diethyl ether, 0.31 part water and 1.76 parts acetyl acetone, were placed, in an atmosphere of nitrogen, in a polymerization vessel which was protected against the action of light. The solution was heated at 60° C., and a mixture comprising 9.5 parts ethylene oxide and 0.5 part 2-benzoyl-5-methoxy-phenyl-glycidyl ether was added dropwise during the course of 1 hour, with agitation. After stirring had been continued at 60° C. for 7 hours, the polymerization was interrupted by the addition of 2 parts ethanol. The solution was concentrated by evaporation in vacuo at 50° C. Yield: 70%.

A film having a thickness of 0.1 mm. was cast from a benzenic solution of this copolymer, said film being exposed to the action of a combined mercury vapor and incandescent lamp (Philips MLL 160 w.) at a distance of 18 cm. for 5 minutes.

In contradistinction to a film of polyethylene oxide obtained according to the same process and treated in the same manner, the film was insoluble in benzene after this treatment

Example 6

100 parts toluene and 6.15 parts of a catalyst solution comprising 4.12 parts aluminum triethyl, dissolved in 11.23 parts n-heptane and 6.94 parts diethyl ether, 0.31 part water and 1.76 parts acetyl acetone, were placed, in an atmosphere of nitrogen, in a polymerization vessel protected against the action of light. The solution was heated at 60° C. and a mixture comprising 9.5 parts ethylene oxide, 0.25 part 4-benzoyl-phenyl-glycidyl ether and 0.25 part 4-acetyl-phenyl-glycidyl ether was added dropwise during the course of 1 hour, with agitation. After stirring had been continued at 60° C. for 7 hours, the polymerization was interrupted by the addition of 2 parts ethanol. The solution was evaporated in vacuo at 50° C. Yield: 60%.

A film having a thickness of 0.1 mm. was prepared from a benzenic solution of this copolymer, said film being exposed to the action of a combined mercury vapor and incandescent lamp (Philips MLL 160 w.) at a distance of 18 cm. for 5 minutes.

In contradistinction to a film of polyethylene oxide obtained according to the same process and treated in the same manner, the film was insoluble in benzene after this treatment.

Example 7

100 parts benzene and 6.15 parts of a catalyst solution comprising 4.12 parts aluminum triethyl, dissolved in 11.23 parts n-heptane and 6.94 parts diethyl ether, 0.31 part water and 1.76 parts acetyl acetone, were placed, in an atmosphere of nitrogen, in a polymerization vessel protected against the action of light. The solution was heated at 60° C., and a mixture comprising 9.5 parts ethylene oxide and 0.5 part 3-benzoyl-phenyl-glycidyl ether was added dropwise during the course of one hour, with agitation. After stirring had been continued at 60° C. for 6 hours, the polymerization was interrupted by the addition of 2 parts ethanol. The solution was concentrated by evaporation in vacuo at 50° C. Yield: 60%.

A film having a thickness of 0.1 mm. was cast from a benzenic solution of this copolymer, which film was exposed to the radiation of an ultraviolet lamp (mercury maximum pressure burner Q 81, power input 70 watt, master Hanau(R)) at a distance of 10 cm. for 5 minutes.

In contradistinction to a film of polyethylene oxide obtained according to the same process and treated in the same manner, the film was insoluble in benzene after this treatment.

We claim:
1. A process for the manufacture of polyethers, which comprises copolymerizing with the substantial exclusion of light, under an inert atmosphere, under anhydrous conditions compounds of Formula I

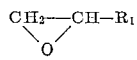

in which
$R_1$ stands for hydrogen, methyl, ethyl, phenyl, methylphenyl, halogeno-phenyl, $-(CH_2)_nCl$, $-(CH_2)_nF$, wherein $n$ is 1 or 2, $-CHCl_2$, $CHF_2$, $-(CH_2)_mCCl_3$, $-(CH_2)_mCF_3$, in which $m$ is 0 or 1, $-CH_2-OR_2$, wherein
$R_2$ is an alkyl with 1 to 5 carbon atoms, allyl, vinyl, phenyl, alkylphenyl in which the alkyl group has 1 to 5 carbon atoms, with compounds of Formula II

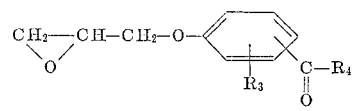

in which
$R_3$ stands for hydrogen, methyl, ethyl, methoxy, ethoxy, chlorine or bromine, and
$R_4$ stands for alkyl with 1 to 5 carbon atoms, phenyl, alkyl-aryl, in which the alkyl group has 1 to 5 carbon atoms, alkoxyaryl, in which the alkoxy group has 1 to 5 carbon atoms, or halogeno-aryl, in the presence of ionic catalysts which bring about an opening of the oxirane rings under the polymerization conditions.

2. The process as claimed in claim 1, wherein the ketone Component II is used in an amount of at least 0.01 mole percent, calculated on the copolymer.

3. The process as claimed in claim 1, wherein the ketone Component II is used in an amount within the range of 0.1 to 10 mole percent, calculated on the copolymer.

4. The process as claimed in claim 1, wherein ethylene oxide is used as Component I.

5. The process as claimed in claim 1, wherein propylene oxide is used as Component I.

6. The process as claimed in claim 1, wherein mixtures of ethylene oxide and propylene oxide in a proportion by weight or from 5 to 95 per cent to 95 to 5 per cent are used as Component I.

7. Copolymers of compounds of Formula I

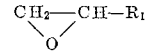

in which
$R_1$ stands for hydrogen, methyl, ethyl, phenyl, methyl - phenyl, halogeno - phenyl, $-(CH_2)_nCl$, $-(CH_2)_nF$, wherein n is 1 or 2, $-CHCl_2$, $CHF_2$, $-(CH_2)_mCCl_3$, $-(CH_2)_mCF_3$, in which $m$ is 0 or 1, $-CH_2-OR_2$, wherein $R_2$ is an alkyl with 1 to 5 carbon atoms, allyl, vinyl, phenyl, alkylphenyl in which the alkyl group has 1 to 5 carbon atoms, with compounds of Formula II

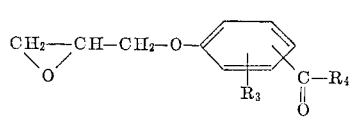

in which
$R_3$ stands for hydrogen, methyl, ethyl, methoxy, ethoxy, chlorine or bromine, and
$R_4$ stands for alkyl with 1 to 5 carbon atoms, phenyl, alkyl, aryl, in which the alkyl group has 1 to 5 carbon atoms, alkoxyaryl, in which the alkoxy group has 1 to 5 carbon atoms, or halogeno-aryl.

References Cited

UNITED STATES PATENTS 3,135,705   6/1964   Vandenberg.

WILLIAM H. SHORT, *Primary Examiner.*

T. D. KERWIN, *Assistant Examiner.*

U.S. Cl. X.R.

260—2, 33.6, 63, 348, 830, 836; 117—161; 96—115